United States Patent
Shakur et al.

(10) Patent No.: US 6,783,120 B2
(45) Date of Patent: Aug. 31, 2004

(54) MULTIPLE DOWNCOMER FRACTIONAL DISTILLATION TRAY AND PROCESS

(75) Inventors: Mohamed S. M. Shakur, Amherst, NY (US); Joseph Agnello, Grand Island, NY (US); Kevin J. Richardson, Hamburg, NY (US); Nicholas F. Urbanski, DePew, NY (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/973,393

(22) Filed: Oct. 9, 2001

(65) Prior Publication Data

US 2003/0067085 A1 Apr. 10, 2003

(51) Int. Cl.⁷ .................................................. B01F 3/04
(52) U.S. Cl. .................................. 261/114.1; 261/114.5
(58) Field of Search .......................... 261/114.1, 114.5, 261/97; 202/158; 203/71

(56) References Cited

U.S. PATENT DOCUMENTS

| | | | |
|---|---|---|---|
| 3,410,540 A | 11/1968 | Bruckert | ..................... 261/113 |
| 4,550,000 A | 10/1985 | Bentham | |
| 5,209,875 A | 5/1993 | Miller et al. | .............. 261/114.1 |
| 5,573,714 A | 11/1996 | Monkelbaan et al. | ..... 261/114.5 |
| 6,116,583 A | 9/2000 | Agnello | .................... 261/114.1 |
| 6,390,454 B1 * | 5/2002 | Urbanski et al. | |
| 6,568,663 B1 * | 5/2003 | Xu et al. | .................. 261/114.1 |

FOREIGN PATENT DOCUMENTS

| | | |
|---|---|---|
| DE | 2011 870 | 9/1971 |
| WO | WO 01/93973 | 12/2001 |

* cited by examiner

Primary Examiner—Scott Bushey
(74) Attorney, Agent, or Firm—John G. Tolomei; David J. Piasecki

(57) ABSTRACT

The performance of multiple downcomer fractional distillation trays is improved by intercepting the liquid egressing from the bottom of the downcomers in a manner which directs a portion of the liquid along the major axis of decking of the next lower tray. This is accomplished by the use of improved antipenetration pans suspended below the downcomers of the upper tray. The antipenetration pans have extensions running parallel to the decking areas of the next lower tray. A portion of the liquid falling from the upper downcomer flows to the end of the extensions, where it falls onto the lower decking at more distant points than with prior art antipenetration pans.

17 Claims, 2 Drawing Sheets

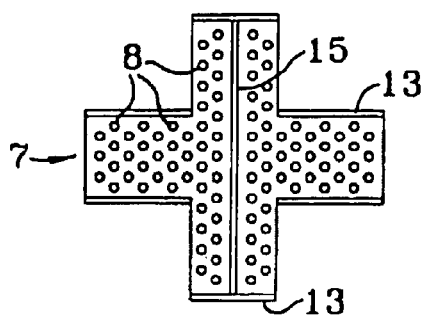
Fig. 3D
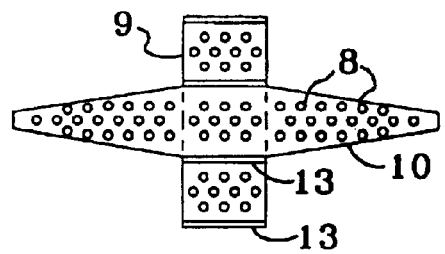
Fig. 6
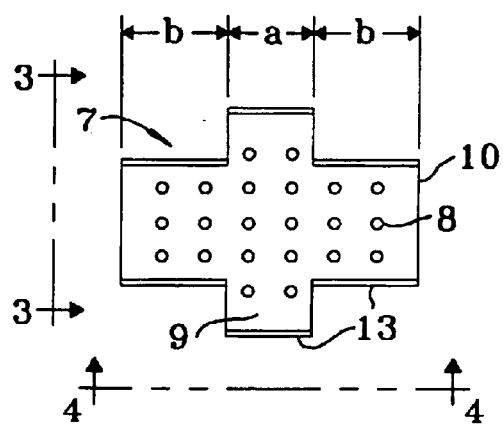
Fig. 2
Fig. 5A
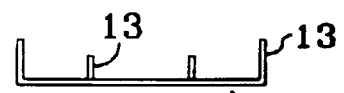
Fig. 3
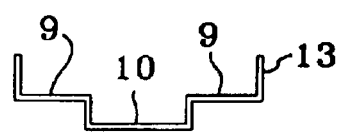
Fig. 3A
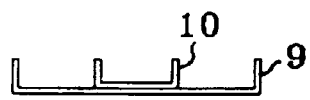
Fig. 3B
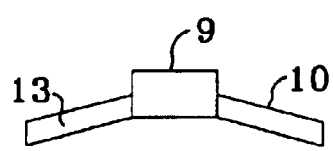
Fig. 4
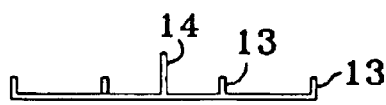
Fig. 4A
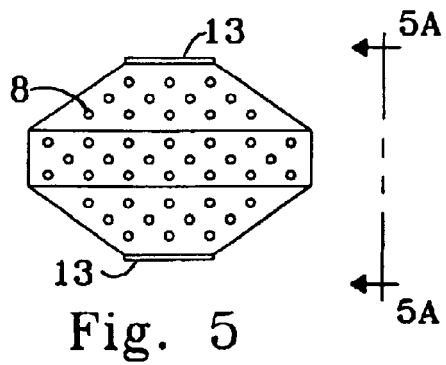
Fig. 3C
Fig. 5

MULTIPLE DOWNCOMER FRACTIONAL DISTILLATION TRAY AND PROCESS

BACKGROUND OF THE INVENTION

1. Field of the Invention

The invention relates to an apparatus for increasing the efficiency of multiple downcomer fractional distillation trays. The invention more specifically relates to a process and apparatus providing a higher efficiency multiple downcomer fractionation tray by use of improved antipenetration pans.

2. Related Art

Multiple downcomer fractionation trays were introduced by U.S. Pat. No. 3,410,540 issued to W. Bruckert. This reference describes the characteristic structure and arrangement of the components of a multiple downcomer tray. These include long, narrow, trough-like downcomers spread across the tray with long rectangular areas of tray decking separating the downcomers. The traditional rectangular shape of the downcomers and transverse arrangement of downcomers on vertically adjacent trays is also shown.

Liquid which falls from the bottom of a downcomer of a multiple downcomer tray falls onto the active vapor-liquid contacting area of the next lower tray. It has been recognized in the art that the liquid falling on decking can penetrate the decking, thus bypassing the intended vapor-liquid contacting. U.S. Pat. No. 5,209,875 introduced the use of antipenetration pans suspended between the decking and the downcomer to eliminate this problem. The antipenetration pans are located under the liquid outlets of the upper tray's downcomer and oriented perpendicular to the downcomers of the lower tray. Liquid exiting the downcomers falls upon the pans and then flows onto the decking of the lower tray.

A more recently developed mounting method for antipenetration pans used on a multiple downcomer style tray is shown in U.S. Pat. No. 6,116,583 issued to J. Agnello. Mechanical details and alternative designs of antipenetration pans are shown in U.S. Pat. No. 5,573,714 to D. R. Monkelbaan et al.

BRIEF SUMMARY OF THE INVENTION

The invention is a novel apparatus designed to increase the overall performance of fractionation columns which contain multiple downcomer fractionation trays. The apparatus comprises a modified antipenetration pan. The antipenetration pan is suspended between vertically adjacent trays, which are mounted transverse to each other. The antipenetration pan intercepts liquid emanating from openings in the bottom of a downcomer of an upper tray and then discharges different portions of the liquid onto the active decking area of the next lower tray at points both under and significantly away from the downcomer openings. This improves the distribution of the liquid on the lower tray. It also retains the antipenetration pans traditional function of preventing the direct passage of liquid through the lower tray.

One broad embodiment of a process employing the invention may be characterized as a fractional distillation process which comprises passing a liquid comprising a first component and a second component onto an upper first tray located in a fractional distillation column containing a plurality of vertically spaced apart fractionation trays operated at fractionation conditions which cause vapor to rise through decking areas provided on the trays while liquid is collected in at least one downcomer forming part of each tray, with liquid which has been collected in a downcomer of the first tray exiting the downcomer through openings located in a lower portion of the downcomer, intercepting liquid, which is passing downward from said openings in the lower portion of the downcomer of the first tray, on a central portion of an antipenetration pan located under said openings and between the first tray and a lower, second tray, with the antipenetration pan also comprising two arms extending away from the central portion and ending at points located at least one-half the width of the central portion away from said central portion and, discharging a portion of the liquid which is intercepted by the central portion of the antipenetration pan onto the decking area of the second tray from each of the two arms of the antipenetration pan.

An apparatus according to the invention may be characterized as an apparatus for performing fractional distillation in a fractionation column, which apparatus comprises an upper first tray and a lower second tray, with both the first and second trays comprising at least one elongated downcomer and two vapor-liquid decking areas adjacent the downcomer, and with the downcomer of the first tray being oriented transverse to the downcomer of the second tray and having at least two groups of liquid outlets in the bottom of the downcomer and, a plurality of antipenetration pans, with the antipenetration pans being mounted at an intermediate level between the downcomers of the first tray and the decking areas of the second tray, and being located under liquid outlets in the bottom of the downcomer of the first tray, the antipenetration pans having a shape which comprises a central portion located under the liquid outlets of the downcomer of the first tray and two extensions aligned parallel with the decking areas of the second tray and reaching over portions of the decking area of the second tray which are not under a group of liquid outlets, whereby at least a first portion of liquid falling from the first tray onto the antipenetration pan is carried to portions of the decking area of the lower second tray which are not under a group of liquid outlets, while a second portion of the falling liquid is allowed to fall from the antipenetration pan onto a portion of the decking area of the second tray which is under the group of liquid outlets. Preferably, only a single antipenetration pan is located under each group of liquid outlets, with a separate antipenetration pan preferably being provided for each group of liquid outlets.

BRIEF DESCRIPTION OF THE DRAWINGS

The working of the invention and the typical arrangement and variations in parts of the apparatus will be described through use of the accompanying drawings in which:

FIG. 2 is an overhead view of a unitary (one piece) antipenetration pan 7 having a configuration similar to the embodiment of the subject invention shown in FIG. 1.

FIG. 3 is an end view of the antipenetration pan of FIG. 2.

FIG. 3A is an end view of an alternative configuration of an antipenetration pan.

FIG. 3B is an end view of an antipenetration pan formed from an upper longitudinal platform 10 attached to a conventional antipenetration pan.

FIG. 3C is an end view of an antipenetration pan having a vertical baffle along the center of the pan.

FIG. 3D is an overhead view of antipenetration pan similar to that of FIG. 2 but having a vertical baffle across the central portion of the pan.

FIG. 4 is a side view of the antipenetration pan of FIG. 2.

FIG. 4A is a side view of an alternative antipenetration pan configuration having sloped arms extending from the central portion of the pan.

FIG. 5 is an overhead view of an antipenetration pan having an alternative shape.

FIG. 5A is an end view of the unitary antipenetration pan of FIG. 5.

FIG. 6 is an overhead view of an antipenetration pan having narrow elongated arms extending laterally from the central portion of the pan.

DETAILED DESCRIPTION AND PREFERRED EMBODIMENTS

Figure 1:
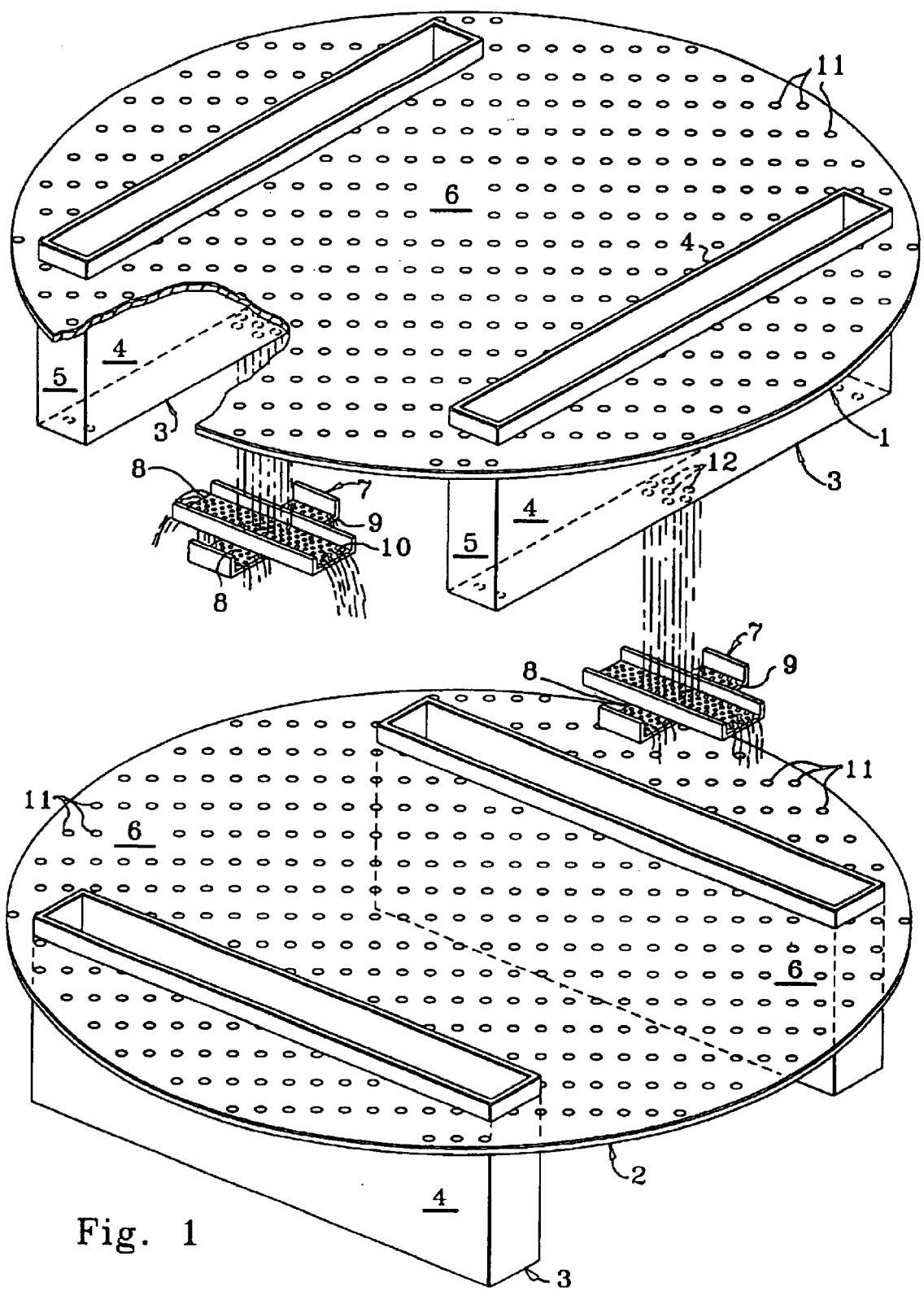
FIG. 1 illustrates the placement of the antipenetration pans 7 of the invention between upper and lower multiple downcomer trays 1 and 2.

Fractionation trays are employed to perform an almost endless variety of separations in the petroleum refining, chemical and petrochemical industries. Fractionation trays are used, for example, in the separation of many different hydrocarbons such as paraffins, aromatics and olefins. Trays are used to separate specific compounds such as alcohols, ethers, alkylaromatics, monomers, solvents, inorganic compounds, etc. and in the separation of broad boiling mixtures such as petroleum derived fractions including naphtha. This great utility has led to the development of a wide variety to trays having differing advantages and disadvantages.

One widely used type of tray is the multiple downcomer tray illustrated in the above cited references. Multiple downcomer trays have several distinguishing physical characteristics. For instance, a multiple downcomer tray does not have the receiving pan traditionally shown on cross-flow trays. This is the normally imperforate section of tray deck located below the bottom of a downcomer. Liquid descending through the downcomer impacts this area of a cross flow tray before passing horizontally onto the perforated decking of the tray. In a conventional tray the receiving pan is normally located directly below the downcomer leading from the next above fractionation tray. This differs from a multiple downcomer tray in which the horizontal surface area of the tray is divided only into areas functioning as downcomer means and flat vapor-liquid contacting (perforated) area normally referred to as decking. There are no imperforate areas allocated to receiving descending liquid from the tray located immediately above.

Another distinguishing feature of a multiple downcomer type fractionation tray is the provision of a relatively large number of parallel downcomers at equal distances across the tray. Each tray can employ from one to fifteen or more such downcomers, which are of similar design. These downcomers are spaced relatively close together compared to those of the more common crossflow fractionation trays as the downcomers are spread across the surface of the tray. The distance between adjacent downcomers (measured between their side walls) of the same multiple downcomer tray will be between 0.2 and 1.0 meters and preferably less than about 0.5 meter. This results in a tray having a unique design, when viewed from above, consisting of the alternating decking areas and downcomer means evenly spaced across the upper surface of the fractionation tray.

The structure of the downcomers of a multiple downcomer tray is also unique compared to the downcomers employed upon crossflow fractionation trays. The long trough-shaped downcomers of multiple downcomer trays do not extend all the way down to the next lower fractionation tray. Rather, they stop at a much higher intermediate level located in a cylindrical void volume located between the two trays. The downcomer extending downward from the tray above therefore stops well above the deck surface of the lower tray and above the inlet to the downcomers of the tray below. The inlet to the downcomers function as the outlet weir of the tray, and the bottom of the downcomer is normally well above the outlet-weir of the lower tray. The horizontal ends-on cross-section of the downcomers can have a wide variety of shapes ranging from rectangular to triangular.

A very distinctive feature of a multiple downcomer fractionation tray is the provision of spaced apart liquid sealable drains in the bottom of the downcomer. The drains are formed by groups of openings in the bottom panel of the downcomer. The drains in the downcomer are small enough to cause the accumulation and retention of froth in the downcomer, allowing it to separate into a clear liquid and released vapor. The accumulated liquid covers the openings in the bottom portion of the downcomer and seals the downcomer against the upward flow of vapor. These liquid sealable outlets are located well above the deck of the tray located immediately below. The clear liquid collected in the lower portion of the downcomer spills forth upon the next lower tray through the grouped openings in the bottom of the downcomer. Some liquid may, if desired, exit through openings in the downcomer side walls. The openings are preferably grouped together and with the groupings located such that the exiting liquid does not fall into a downcomer of the next lower tray.

Multiple downcomer trays have high vapor and liquid capacities and the ability to function effectively over a significant range of operating rates. Multiple downcomer trays are noted for their high capacity. They were therefore included in an article entitled "High-Capacity Distillation" published at page 53 of the August 1998 edition of *Hydrocarbon Processing* and in an article starting at page 23 of the January 1999 edition of *Chemical Engineering Process*. These articles show the transverse arrangement of the downcomers on vertically adjacent trays and describe the flow of vapor and liquid through fractionation columns employing these trays. Other types of trays, however, can have higher efficiencies than multiple downcomer trays. It is postulated that this is caused in part by the liquid falling from the grouped liquid openings of the downcomers landing on the decking of the next lower tray in places which lead to a variety of liquid flow path lengths and liquid retention times on the tray. This results from the preferred transverse arrangement of downcomers on vertically adjacent trays. This arrangement results in the liquid falling from the downcomer downspouts at a number of spaced apart zones under the liquid openings. For instance, on trays with only two downcomers there are only three groups of liquid downspouts per downcomer. The spacing between these zones is equal to the spacing between the overlying downcomers. The liquid must flow from these impact zones to the downcomer of the lower tray.

Some points on the downcomer are further from the liquid impact zones than others. It takes the liquid a longer time to flow the greater distance to those parts of the decking of the lower tray which are between the zones at which the liquid falls upon the decking. Some points on the deck are therefore not well "irrigated". It takes liquid longer to reach and to then leave these zones. The non-uniform liquid residence time results in a reduced tray efficiency. For instance, the continued vapor-liquid contacting of stagnant liquid fails to promote additional mass transfer. It is an objective of this invention to improve the performance of multiple downcomer trays. It is a further objective of the subject invention to provide an improved process for separating volatile chemical compounds by fractional distillation.

The subject invention achieves these objectives by the use of antipenetration pans having an improved design. The antipenetration pan is designed and placed to intercept at least a majority of the liquid descending from the drains of the upper tray before it can impact the decking of the lower tray. It then allows a portion to fall upon the decking under the drains and carries another portion of the liquid away from this location so it falls on decking located further along the downcomers of the lower tray. Thus the points at which liquid falls on the decking are more spread out. The average residence time of the liquid on the tray, the time from when the liquid falls upon the decking to the time at which the liquid exits the lower tray, is more uniform.

Past efforts to improve the performance of multiple downcomer trays have centered upon the liquid descending from the downcomer outlets and its impact upon the tray decking. For instance, the antipenetration pans described in the references referred to above intercept the liquid and distribute it such that it does not tend to force its way through the decking perforations. Such a direct passage through the decking would result in liquid bypassing the lower tray and removing vapor perforations from use. The subject apparatus performs this function but also distributes a portion of the falling liquid. The devices of the subject invention discharge a portion of the liquid toward poorly irrigated portions of the next lower tray.

While the description of the subject invention is presented primarily in terms of use on multiple downcomer trays, it is envisioned that it can also be applied to other types of trays including cross-flow trays having a structural member which functions as an antipenetration pan. Such devices are present in some trays having a chordal downcomer which is truncated above the decking of the lower tray.

By depositing some of the liquid in areas between adjacent downcomers which otherwise don't directly receive fresh liquid, the overall mass transfer of the tray is enhanced. The residence time of the liquid on the tray is more uniform. This becomes more important as the diameter of the tray increases, as the distance between downcomer centerlines tends to increase. It may exceed 0.61 m (24 in.). The liquid may fall onto these areas or simply flow toward them in a directed stream.

The apparatus of the invention may be characterized as an apparatus for performing fractional distillation in a fractionation column, which apparatus comprises an upper first tray and a lower second tray, with both the first and second trays comprising at least two trough-shaped downcomers and at least one elongated vapor-liquid decking area located between the downcomers, and with the downcomers of the first tray being oriented differently than the downcomers of the second tray, with the downcomers of each tray having at least two groups of spaced apart liquid outlets in the bottom of the downcomers; and, at least two antipenetration pans mounted between the bottom of the downcomers of the first tray and the top of the vapor-liquid decking area of the second tray, with only one antipenetration pan being located under each of the groups of liquid outlets in the first tray, the antipenetration pans comprising a perforated horizontal first platform having a major axis perpendicular to the downcomers of the second tray and an overlying generally U-shaped second platform attached to the first platform, the second platform having a major axis parallel to the downcomers of the second tray and ends located beyond the first platform.

The overall process of the subject invention can be best described by reference to the Drawing. FIG. 1 of the Drawing is a simplified perspective view of two vertically adjacent trays of a fractionation column. FIG. 1 shows an upper multiple downcomer fractionation tray 1 and a lower multiple downcomer fractionation tray 2. The downcomers on these two vertically adjacent trays are oriented perpendicular to one another in the manner commonly employed with multiple downcomer fractionation trays. This transverse alignment is not required but gives many advantages, such as mixing of the liquid and vapor from different portions of the tray. The downcomers of adjacent trays could be arranged at other angles such as 60 degrees.

When used for the fractional distillation of volatile chemical compounds liquid, which could be described as an aerated froth, rests upon the upper surface of the fractionation trays. The frothing or aeration of the liquid is caused by the upward passage of vapor through a great number of perforations 11 spread in a relatively uniform manner across the entire surface of the decking 6 of the trays. These perforations are typically small diameter circular openings, but it is known to employ a mixture of perforation types such as these "sieve" openings plus vapor directing slots or the "valves" of U.S. Pat. No. 5,975,504. Such slots may be arranged in rows along the length of the decking or concentrated in certain deck areas. The liquid-containing froth overflows the downcomer inlet weir at the top of the two downcomers and flows into the top of the downcomer 3. When the tray is operating correctly, the froth will disengage releasing the vapor and forming a "clear liquid" which accumulates in a lower portion of each of the downcomers. The accumulated liquid effectively seals the grouped liquid outlets 12 clustered at predetermined spaced apart locations along the bottom portion of the downcomer. Each of the four downcomers illustrated in this figure is composed of two sidewalls 4 and two endwalls 5. This trough-shaped downcomer construction with parallel sidewalls 4 is typical of the predominant construction of these downcomers. However, downcomers may be formed in a number of different cross-section shapes such as triangular or a truncated triangle, etc. The side and end walls typically extend above the decking to form a weir around the downcomer inlet.

The liquid outlets 12 in the bottom plate of the downcomer 3 are arranged into spaced apart downspout groupings located such that liquid emanating from a downcomer will not fall directly into the inlet of the downcomers of the next lower tray. That is, the outlets 12 of the upper tray are not located directly above the inlet of a downcomer of the lower tray. Instead these outlets 12 are located such that the liquid leaving the downcomer of the upper tray would fall upon the decking at a point between the downcomers of the next lower tray. The subject invention provides antipenetration pans 7 which are suspended at an intermediate elevation between the two fractionation trays 1 and 2. They are therefore located in a cylindrical void volume between the decking layers of the two trays. To function, the pans must be located directly below the downspouts of the upper tray's downcomer such that the descending liquid impacts the central portion of the antipenetration pans. They must also be above the decking of the lower tray to limit interference with the active frothing desired on the lower tray's decking. The antipenetration pans 7 may be retained in place by a wide variety of mechanical arrangements which anchor the pans 7 to either the upper tray or lower tray or to both. The antipenetration pans may be attached directly to the downcomers of the above tray or to the tray deck 6. Alternatively, independent horizontal members may extend across the internal volume of the fractionation column to support the antipenetration pans 7. The antipenetration pans 7 can also include integral extensions which reach horizontally to the inner surface of the outer wall of the fractionation column or to the lower downcomers. This would allow each of the antipenetration pans 7 to be independently mounted within the column by attachment to the wall or to existing fractionation tray hardware. The manner in which the antipenetration pans 7 are supported within the column is not a controlling feature of the subject invention. Supports such as shown in the cited references are preferred.

The antipenetration pans 7 intercept the liquid shown leaving the bottom of the downcomers through the outlet openings 12. In a preferred embodiment the pans are cross-shaped with four arms horizontally outward from under the outlet openings 12. In this manner most of the descending liquid from the upper tray is collected upon the pan 7, with only a small portion flowing directly through the pan via openings 8. The remaining liquid flows horizontally across or along the length of the pan 7 before falling off an unobstructed edge. This results in liquid falling on the decking of the lower tray directly under the antipenetration pan and on the decking along the edges of the minor axis arm 9 and the ends of the major axis arm 10. The major axis arms or distributors are aligned parallel to the downcomer 3 of the lower tray 2 and, therefore, the liquid egressing from the ends of the antipenetration pans 7 is deposited upon the decking 6 of the lower tray 2 at points intermediate the downcomers 3 of the lower tray.

The preferred structure of the subject antipenetration pans is as shown in FIG. 1. It consists of two perpendicular pieces of perforated heavy gauge sheet metal similar to the decking and having bent up vertical sections along edges of the pan which are parallel to the downcomer(s) of the lower tray. The bent up edges retard liquid flow toward these downcomers and prevents liquid from flowing directly into the downcomers of the lower tray. These edges should be from about 2 to 5 cm. high. The use of this design, which adds the major axis platform 10 to a conventional antipenetration pan such as shown in U.S. Pat. Nos. 5,209,875 and 5,573,714 is preferred. The newly added major axis platform has a shallow U-shape providing a chute for carrying liquid away from the central portion of the pan. The sidewalls also strengthen the structure. The added major axis platform runs parallel to the lower downcomer and is preferably at least 50% longer than the minor axis platform, which is perpendicular to the lower downcomers. The distance from the center of the antipenetration pan to each end of the arms is preferably from ¼ to ⅓ of the distance between downcomer center lines. The distance between the ends of the arms of two adjacent pans is preferably is preferably between ¼ to ½ of the distance between the center lines of their respective downcomers. There is a huge number of acceptable alternative designs. Some of these are shown in the other figures.

If a decking panel is bordered on two sides by downcomers, it is preferred that the antipenetration pan is located halfway between the downcomers. At the edge of a tray there are two crescent section shaped decking panels lying between a downcomer and the inner surface of the column wall. It is preferred that any antipenetration device above this decking section is placed nearer to the wall than to the downcomer to minimize stagnant liquid near the wall. It is still directly under the outlet grouping of the upper downcomer(s).

FIG. 2 is an overhead view of a unitary (one piece) antipenetration pan having a configuration similar to the antipenetration pans shown in FIG. 1. This pan, however, is made form a single piece of metal rather than the two pieces used in the construction of the pans shown in FIG. 1. It also differs in that the major axis arms or extensions 10 are wider than the minor axis arms 9. It is similar to the antipenetration pans of FIG. 1 in that it has a cross-like shape and has the upward bent edges 13 which prevent liquid flowing off the pan directly toward the downcomers of the lower tray. Liquid, however, can flow downward through the pan through the openings 8 which are evenly distributed across all portions of the antipenetration pan. Liquid may also flow off the edges of the minor axis platform 9 which do not have the bent up edge. A third portion of the intercepted liquid will flow off the ends of the major axis arms 10 of the pan. While in use in a fractionation tray, liquid rains down upon the central portion of the antipenetration pan and then leaves the antipenetration pan by one of three routes.

The liquid on the tray decking is extremely agitated due to the relatively high velocity vapor passing upward through the openings in the decking. The result is a large degree of agitation of the liquid resulting in droplets splashing about in many directions. The liquid in between the trays is, therefore, not quiescent and does not flow in a gentle manner. Some liquid will, therefore, splash or jump off of the antipenetration pan over the raised up portions of the pan and may even jump up onto the pan or be deflected upon the pan from the decking below.

FIG. 3 is the view seen looking in the direction indicated in FIG. 2 toward the end of the antipenetration pan of FIG. 2. This view more clearly shows the flat construction of the antipenetration pan which is interrupted only by the four bent up edges 13. This figure is useful in illustrating that the bent up edges 13 may be of different heights, with taller portions being located at each end of the minor axis member of the pan to better prevent direct passage of liquid from the antipenetration pan into the downcomer of the next lower tray. FIG. 3 shows the pan is preferably formed by a single layer of material. It is highly preferred to avoid stacking or overlapping of any part of two different pans or to have vertically separated layers form any part of a pan. FIG. 3A is an end view of an antipenetration pan having an alternative configuration. In this antipenetration pan design the major axis platform 10 of the antipenetration pan is sunk lower than the horizontal minor axis arm of the pan. This design may be utilized if it is desired to enhance the flow of liquid from the minor axis member of the pan into the major axis member of the pan such that more of the liquid is deposited at the center of the decking area.

FIG. 3B is an end view of an antipenetration pan constructed according to the preferred embodiment shown in FIG. 1. It shows that the antipenetration pan is made from two low profile or shallow U-shaped members with the major axis member overlying the minor axis member 9. These two members may be fastened together by welding or by bolts or screws which pass through the perforations in the two members. Preferably, the means used to attach the two members together will also attach it to the support means extending to the next tray below or to the downcomer above. This configuration is preferred as a revamp of already installed antipenetration pans. The new major axis member is added to the existing element 9. As a result some liquid is carried to more distant parts of the underlying decking.

FIG. 3C shows an end view of yet another configuration of an antipenetration pan of the invention. This embodiment employs a single piece construction similar to that of FIG. 2 but adds a central vertical wall 14 which would extend down the length of the major axis of the pan. This vertical wall 14 strengthens this portion of the pan, calms the liquid upon the pan and thereby increases the amount of liquid which exits the ends of the pan.

FIG. 3D shows an overhead view of an antipenetration pan of FIG. 2 except that this embodiment of the pan has a vertical baffle extending upward from the upper surface of the pan. This baffle extends along the minor axis of the pan perpendicular to the baffle shown in FIG. 3C. The antipenetration pan may have baffles in both directions, if desired.

FIG. 4 is the view seen looking towards the side of the antipenetration pan of FIG. 2. It illustrates that the bent up edge portions 13 of the pan are of two different heights, with those present at the ends of the minor axis portion of the pan being taller than those present along the length of the major axis portions of the pan. FIG. 4A shows another alternative embodiment of a pan similar to that of FIG. 2 but having the two arms of the major axis member of the pan being inclined creating a chute which promotes liquid will run toward the extreme ends of the pan. This again is a means of increasing the amount of liquid which is discharged away from immediately under the openings in the downcomer of the tray above. In addition, such an inclination can introduce additional horizontal momentum to the liquid leaving the pan which will be transferred to liquid on the decking of the tray below thus pushing it toward under-irrigated deck areas.

FIG. 5 is an overhead view of a unitary (one-piece) antipenetration pan in which the minor axis portion of the pan has tapered sides which extend outward to the end of the major axis portion or member of the pan. This will increase the tendency of the pan to retain liquid and the pan's ability to distribute liquid away from points directly under the grouping of liquid outlets of the downcomer above. This design, however, has the disadvantage of increasing the horizontal cross-section of the antipenetration pan which may interfere with vapor and liquid contacting by confining the froth generated under the antipenetration pan. The two lines extending along the major axis of the antipenetration pan are intended to indicate that the pan is not flat. This may be observed by reference to FIG. 5A which shows an end view of the antipenetration pan of FIG. 5. The inclined outer portions of the antipenetration pan minimize the need for bent up wall sections along the major axis of the pan with the result that the bent up wall sections 13 are only located at the terminal portions of the minor axis.

FIG. 6 is yet another alternative configuration of an antipenetration pan according to the subject invention. The shape of this antipenetration pan moves in the opposite direction from the variation introduced in FIG. 5. This antipenetration pan reduces the cross section of the major portion of the pan and tapers the two arms of the major member. The result is less horizontal cross section and less interference with the agitation of the froth on the decking below. In an attempt to compensate for this bent up wall portions 13 are provided in the central portion of the antipenetration pan in addition to those at the ends of the minor axis member of the pan. In addition, the major axis portion of the pan may be inclined downward similar to FIG. 4A to increase the horizontal travel of liquid toward the ends of the arms.

The devices of the subject invention can be employed in a new fractionation column, as part of new trays being installed in an existing column. They may also be added to multiple downcomer trays already present in a column. Existing antipenetration pans may be modified to conform to the subject invention by the addition of the major axis 10 as shown in FIG. 3B.

A preferred embodiment of the subject invention can accordingly be characterized as a fractional distillation process which comprises passing a liquid comprising a first volatile compound and a second volatile compound downward through a fractional distillation column containing a plurality of vertically spaced apart multiple downcomer fractionation trays and operated at fractionation conditions which cause vapor to rise through decking areas provided on the trays while liquid is collected in a trough-shaped downcomer present on each tray, with liquid which has been collected in said downcomer exiting the downcomer through grouped openings located in a lower portion of the downcomer; discharging descending liquid from the openings in the lower portion of the downcomer of the upper first tray upon a plurality of antipenetration pans located between the first tray and a lower second tray, with the antipenetration pans comprising a central portion located under the grouped openings of the downcomer of the first tray and above a decking area of the second tray; and discharging liquid from the central portion of the antipenetration pans onto the decking area of the second tray and also discharging liquid onto the decking of the second tray from each of two arms which in extend parallel to a downcomer of the second tray.

Operating conditions for a fractionation column are confined by the physical properties of the compounds being separated in the column. Operating temperature and pressure of a column may be varied within these confines to minimize costs while optimizing performance and to accommodate other commercial objectives. The operating temperature may range from very low temperatures used in cryogenic separations to temperatures which challenge the thermal stability of the compounds. Conditions suitable for the column of the subject process therefore include a temperature in the broad range of from about −50 to about 250 degrees C. The column must be operated at a pressure sufficient to maintain at least a portion of the feed compounds present as a liquid. High pressures require a much more costly outer vessel and accessory equipment including reboilers and overhead condensers. It is, therefore, generally desired to operate a column in the lower portion of the range of possible operating pressures unless it adversely effects the operation of the column. Fractionation pressures may range from subatmospheric pressure to a pressure up to about 35 bar.

What is claimed:

1. A fractional distillation process which comprises:
   (a) passing a liquid comprising a first component and a second component onto an upper first tray located in a fractional distillation column containing a plurality of vertically spaced apart fractionation trays operated at fractionation conditions which cause vapor to rise through decking areas provided on the trays while liquid is collected, in at least one downcomer portion of each tray, the liquid collected in the downcomer of the first tray exiting the downcomer through openings located in a lower portion of the downcomer,
   (b) intercepting liquid, which is passing downward from said openings in the lower portion of the downcomer of the first tray, on a central portion of an antipenetration pan located under said openings and between the first tray and a lower, second tray, the antipenetration pan comprising two arms extending away from the central portion and ending at points located at least one-half the width of the central portion away from said central portion;
   (c) discharging a first portion of the liquid which is intercepted by the central portion of the antipenetration pan onto the decking area of the second tray from each of the two arms of the antipenetration pan; and (d) passing a second portion of the liquid which is intercepted by the antipenetration pan downward through openings in the central portion of the antipenetration pan.

2. The process of claim 1 further characterized in that liquid is discharged from the arms of the antipenetration pen in a direction substantially parallel to a downcomer of the second tray.

3. The process of claim 1 further characterized in that the central portion and each of the two arms of the antipenetration pan are rectangular.

4. A fractional distillation process which comprises:
(a) passing a liquid comprising a first volatile compound and a second volatile compound downward through a fractional distillation column containing a plurality of vertically spaced apart multiple downcomer fractionation trays and operated at fractionation conditions which cause vapor to rise through decking areas provided on the trays while liquid is collected in a trough-shaped downcomer present on each tray, with liquid which has been collected in said downcomer exiting the downcomer through grouped openings located in a lower portion of the downcomer;
(b) discharging descending liquid from the openings in the lower portion of the downcomer of the upper first tray upon a plurality of antipenetration pans located between the first tray and a lower second tray, with the antipenetration pans comprising a central portion located under the grouped openings of the downcomer of the first tray; and
(c) discharging liquid from the central portion of the antipenetration pans onto the decking area of the second tray and also discharging liquid onto the decking of the second tray from each of two arms which extend outward from the central portion of the antipenetration pan in directions parallel to a downcomer of the second tray.

5. The process of claim 4 further characterized in that the number of antipenetration pans per tray is greater than the number of downcomers per tray.

6. The process of claim 4 further characterized in that the downcomers of the second tray are substantially perpendicular to the downcomers of the first tray.

7. The process of claim 4 further characterized in that at least one-third of the liquid which is discharged upon an antipenetration pan from the upper first tray is in turn discharged from the antipenetration pan via the two arms of the antipenetration pan.

8. An apparatus for performing fractional distillation in a fractionation column, which apparatus comprises:
(a) an upper first tray and a lower second tray, with both the first and second trays comprising at least two trough-shaped downcomers and at least one elongated vapor-liquid decking area located between the downcomers, and with the downcomers of the first tray being oriented differently than the downcomers of the second tray, with the downcomers of each tray having at least two groups of spaced apart liquid outlets in the bottom of the downcomers; and,
(b) at least two antipenetration pans mounted between the bottom of the downcomers of the first tray and the top of the vapor-liquid decking area of the second tray, with one antipenetration pan being located under each of the groups of liquid outlets in the first tray, the antipenetration pans comprising a perforated horizontal first platform having a major axis perpendicular to the downcomers of the second tray and an overlying generally U-shaped second platform attached to the first platform, the second platform having a major axis parallel to the downcomers of the second tray and ends located beyond the first platform.

9. The apparatus of claim 8 further characterized in that the first platform has raised end pieces parallel to the downcomers of the second tray.

10. The apparatus of claim 9 further characterized in that the length of the second platform is equal to 100 to 200% of the length of the first platform.

11. An apparatus for performing fractional distillation in a fractionation column, the apparatus comprising:
(a) an upper first tray and a lower second tray, with both the first and second trays comprising at least one elongated downcomer and two vapor-liquid decking areas adjacent the downcomer, the downcomer of the first tray having at least one group of liquid outlets in the bottom of the downcomer;
(b) an antipenetration pan being mounted at an intermediate level between the downcomer of the first tray and the decking areas of the second tray, the antipenetration pan comprising a perforated, planar, central portion and at least two substantially planar extensions, wherein the central portion of the antipenetration pan being substantially parallel to the decking areas of the second tray is located under the group of liquid outlets of the downcomer of the first tray, and the substantially planar extensions projecting outward from the central portion of the antipenetration pan over and substantially parallel to areas of the decking of the second tray which are not under a group of liquid outlets.

12. The apparatus of claim 11 wherein the downcomer of the first tray being oriented transverse to the downcomer of the second tray.

13. The apparatus of claim 11 further comprising a plurality of liquid outlets and a plurality of antipenetration pans, there being no more than one antipenetration pan located under a group of liquid outlets and no more than one group of liquid outlets above an antipenetration pan.

14. The apparatus of claim 11 further comprising a raised end piece extending upwardly from an edge of the antipenetration pan.

15. The apparatus of claim 11 further comprising a baffle extending upwardly from the central portion of the antipenetration pan.

16. The apparatus of claim 11 wherein the extensions are aligned parallel to the down corner of the second tray.

17. An apparatus for performing fractional distillation in a fractionation column, the apparatus comprising:
(a) an upper first tray and a lower second tray, with both the first and second trays comprising at least one elongated downcomer and two vapor-liquid decking areas adjacent the downcomer, the downcomer of the first tray having at least one group of liquid outlets in the bottom of the downcomer;
(b) an antipenetration pan being mounted at an intermediate level between the downcomer of the first tray and the decking areas of the second tray, the antipenetration pan comprising a perforated, planar, central portion and at least two, perforated, substantially planar extensions, wherein the central portion of the antipenetration part being substantially parallel to the decking areas of the second tray is located under the group of liquid outlets of the downcomer of the first tray, and the substantially planar extensions projecting outward from the central portion of the antipenetration pan over areas of the decking of the second tray which are not under a group of liquid outlets.

* * * * *

UNITED STATES PATENT AND TRADEMARK OFFICE
CERTIFICATE OF CORRECTION

PATENT NO.    : 6,783,120 B2
DATED         : August 31, 2004
INVENTOR(S)   : Shakur et al.

It is certified that error appears in the above-identified patent and that said Letters Patent is hereby corrected as shown below:

Column 11,
Line 6, "pen" should be replaced with -- pan. --

Signed and Sealed this

Thirtieth Day of November, 2004

JON W. DUDAS
*Director of the United States Patent and Trademark Office*